Patented Oct. 11, 1932

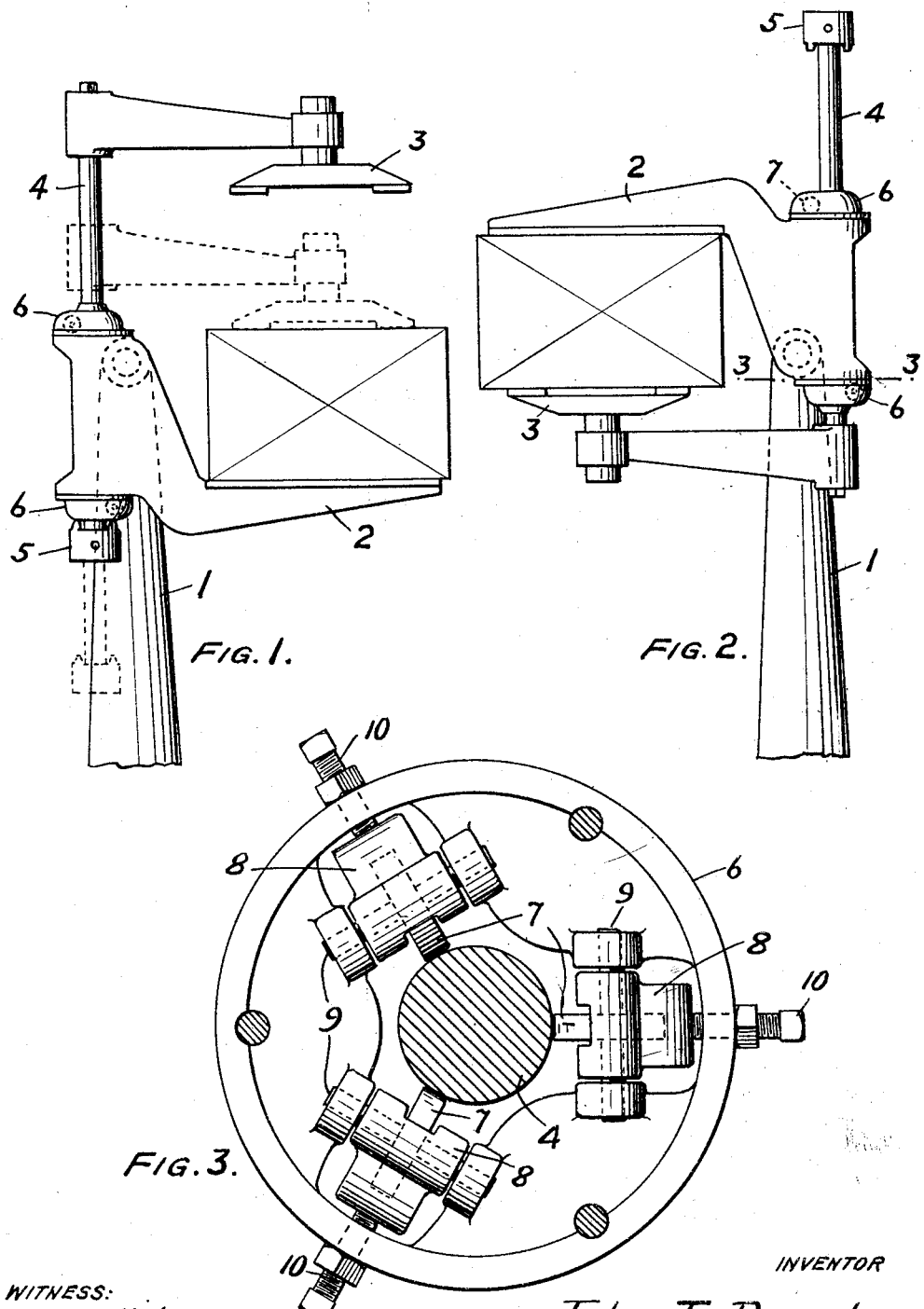

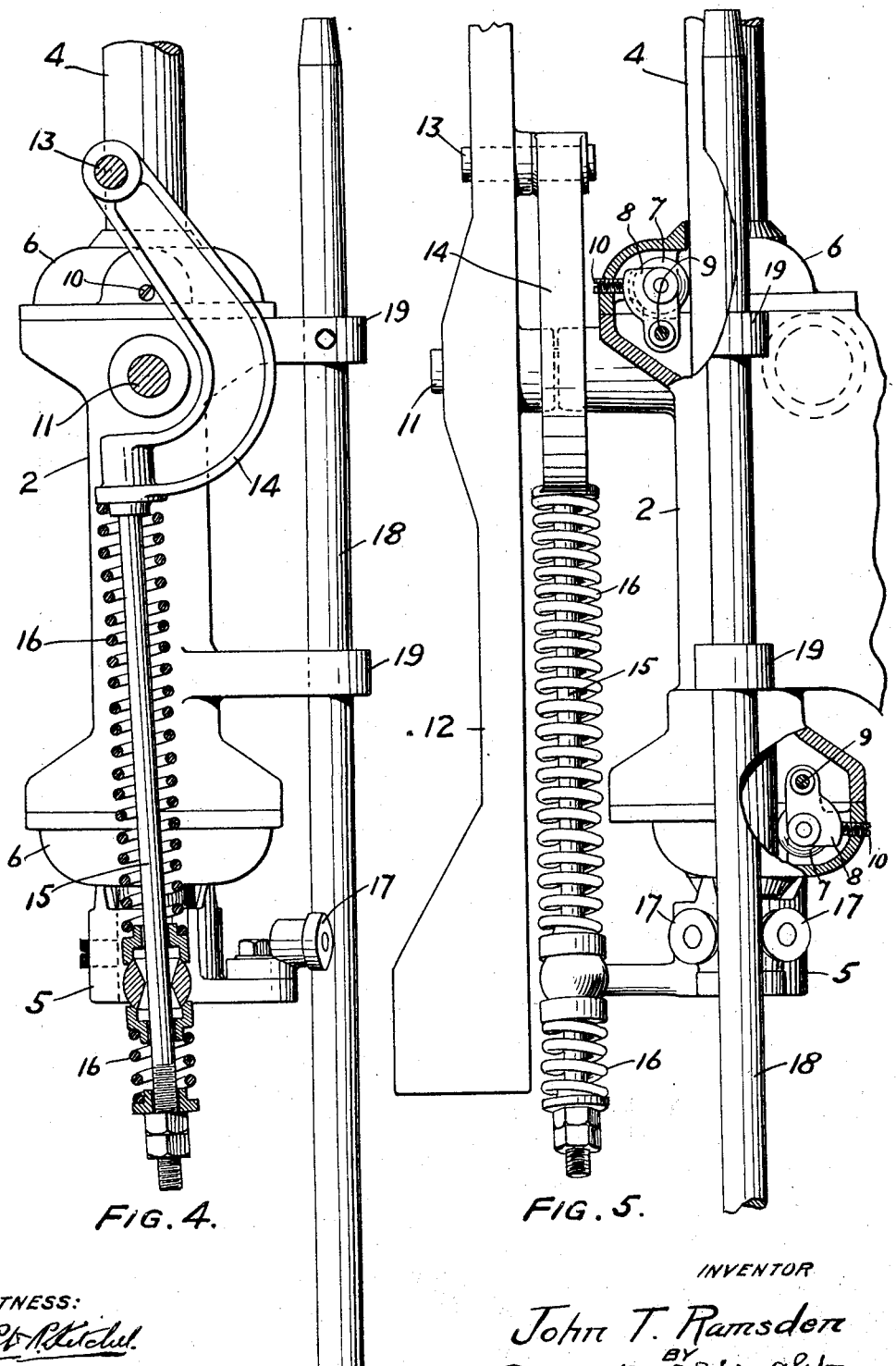

1,882,446

UNITED STATES PATENT OFFICE

JOHN T. RAMSDEN, OF PHILADELPHIA, PENNSYLVANIA, ASSIGNOR TO THE TABOR MANUFACTURING COMPANY, OF PHILADELPHIA, PENNSYLVANIA, A CORPORATION OF PENNSYLVANIA

STRAIGHT LINE GUIDE FOR MOLDING AND OTHER MACHINES

Application filed October 3, 1929. Serial No. 396,995.

My invention relates to an improvement in straight line guides for two relatively movable elements of molding and other machines. It consists essentially in providing a roller whose axis is disposed at ninety degrees to the axis of the shaft, and the object is to provide a bearing that does not have to be lubricated for use when dust or sand is a source of trouble.

For a further description of my invention reference may be had to the annexed drawings and specification at the end whereof my invention will be specifically pointed out and claimed.

In the drawings,

Figure 1 represents a side view showing my improvement in application to one type of molding machine.

Figure 2 is a side view showing the flask in rolled over position.

Figure 3 is a plan view of the shaft in cross section showing the bearing taken in line 3—3 of Figure 2.

Figure 4 is a side view with parts in section, and

Figure 5 is a side view at an angle of 90° to Figure 4 with parts broken away to show the bearings.

The invention will be described in connection with a rollover molding machine, but it is applicable to other types of machines.

Rollover molding machines of this type consist of a standard or support 1 carrying at its upper end a shaft about which the bracket or arm 2, the clamp 3 and the operating mechanism for clamp 3 rotate as a unit. The upper clamp 3 is carried by a shaft 4 and is adapted to be moved towards or away from a flask, mold or core box mounted on arm 2. The operating mechanism for shaft 4 and clamp 3 is omitted from Figures 1 and 2 for the sake of clearness but is shown in detail in Figures 4 and 5. Shaft 4 carries at its lower end a collar 5 to which the operating mechanism is attached. Arm 2 carries at its rear bearing housings 6 of which only one will be described as they are duplicates. In housings 6 are located roller bearings 7 which provide the bearing between shaft 4 and arm 2. Housings 6 are secured to arm 2 in any suitable way as by cap screws not shown. Referring particularly to Figure 3 there is shown housings 6 in which the roller bearings 7 are located in hangers 8 which are pivoted on shafts 9. Set screws 10 provide a means for adjusting the position of rollers 7 inwardly or outwardly about shafts 9 as a pivot. Since the load of the flask on arm 2 is off-centered one of the bearings 7 in each of the housings 6 is aligned with the shaft 4 as shown in dotted lines in Figures 1 and 2. These rollers are positioned so as to resist the tendency of the load to turn the arm 2 about a portion of shaft 4.

Referring now more particularly to Figures 4 and 5 there is mounted on arm 2 a shaft 11 upon which is pivoted counterweight 12 which has at its upper end an actuating handle not shown for moving the mechanism to cause clamp 3 to fasten a flask upon arm 2. This clamping mechanism consists of a pin 13 which connects a yoke 14 to the counterweight 12 and its actuating handle. Yoke 14 carries a pin 15 on which are centered springs 16 which provide a resilient connection between yoke 14 and collar 5 which is the operating member for shaft 4. Collar 5 also carries guide rollers 17 which cooperate with rod 18 mounted in lugs 19 on arm 2. When guide rollers 17 are in contact with rod 18 they prevent rotation of shaft 4 with relation to arm 2.

From an inspection of Figures 1 and 2 it will be evident that the rollers 7 are in such a position as to be subjected to large amounts of sand which would seriously affect the operation and life of the machine. The housings 6 serve in large measure to guard the rollers 7 from the sand particularly because there is very little clearance between housings 6 and shaft 4. As an additional precaution against the entrance of sand between the rollers 7 and the shaft 4, the rollers 7 may be provided with faces which are curved in axial cross section. By this means contact between rollers 7 and shaft 4 is reduced to a single point of contact with surfaces flaring away in all directions so that the tendency of the cooperating movement of shaft 4 and rollers 7 is to expel any sand which has a tendency to enter therebetween. The rollers 7, however, may be truly cylindrical. In practice, too, shaft 4 develops a flat space opposite the rollers 7 or shaft 4 may be provided originally with flat surfaces. In such cases there is a line contact between the shaft and the roller.

In assembling a molding machine equipped with my invention the caps 6 are secured to the arm 2 by suitable screwing means and the shaft 4 is then inserted through the caps 6 and the arm 2. Then the upper roller 7 on the opposite side from the load on arm 2 and the lower roller 7 on the nearest side to the load on arm 2 are then adjusted so that the axis of shaft 4 is a true angle of 90° to the surface of arm 2 upon which the load 2 is mounted. The set screws 10 which control the remaining rollers 7 are then adjusted to bring the remaining rollers into contact with the shaft 4. This operation may be repeated whenever the axis of shaft 4 gets out of a true alignment of 90° to the load surface of arm 2.

I do not intend to be limited in the practice of my invention save as the scope of the prior art and the attached claims may require.

I claim:

1. A molding machine including an arm adapted to carry a load, a shaft slidable through said arm, an upper bearing located in a diametric axis of said shaft opposite said load, and a lower bearing located in a diametric axis of said shaft nearest said load.

2. A molding machine including an arm, a shaft slidable through said arm, roller bearings provided between said shaft and said arm providing single points of contact between said shaft and said arm, a guide shaft mounted on said arm, and roller bearings mounted on said shaft to cooperate with said guide shaft.

3. A molding machine including an arm exposed to falling sand, a cylindrical shaft slidable through the arm, cylindrical rollers providing point contact between the arm and the shaft whereby the entry of sand is opposed, and pivots for the rollers whereby the rollers contact only with the surface of the shaft leaving the rear surfaces of the rollers free to cause sand to fall off them.

JOHN T. RAMSDEN.